United States Patent
Everhart

(10) Patent No.: US 9,834,911 B2
(45) Date of Patent: Dec. 5, 2017

(54) WATER SYSTEM LEAK DETECTION

(71) Applicant: William Duke Everhart, Wilmington, NC (US)

(72) Inventor: William Duke Everhart, Wilmington, NC (US)

(*) Notice: Subject to any disclaimer, the term of this patent is extended or adjusted under 35 U.S.C. 154(b) by 0 days.

(21) Appl. No.: 15/091,734

(22) Filed: Apr. 6, 2016

(65) Prior Publication Data

US 2017/0044744 A1    Feb. 16, 2017

Related U.S. Application Data

(60) Provisional application No. 62/204,522, filed on Aug. 13, 2015.

(51) Int. Cl.

| | |
|---|---|
| *F16K 31/02* | (2006.01) |
| *E03B 7/00* | (2006.01) |
| *E03B 7/07* | (2006.01) |
| *F16K 37/00* | (2006.01) |
| *G01M 3/28* | (2006.01) |

(52) U.S. Cl.
CPC ............. *E03B 7/003* (2013.01); *E03B 7/071* (2013.01); *F16K 37/0075* (2013.01); *G01M 3/2815* (2013.01)

(58) Field of Classification Search
CPC .......... F16K 31/06; E03B 7/003; E03B 7/071; G05D 7/0617; G01M 3/18; Y10T 137/7761; Y10T 137/7762; Y10T 137/7726; Y10T 137/7727; Y10T 137/86389; Y10T 137/86397; Y10T 137/86045; Y10T 137/86485; Y10T 137/7723; Y10T 137/2531

USPC ... 137/487.5, 488, 459, 460, 624.11, 624.12, 137/624.13, 624.27, 101.21, 456; 340/605

See application file for complete search history.

(56) References Cited

U.S. PATENT DOCUMENTS

| | | | | |
|---|---|---|---|---|
| 2,767,392 | A | * | 10/1956 | Szwargulski ........... G01M 3/18 137/557 |
| 3,416,560 | A | * | 12/1968 | Bruno ................... F15B 20/005 137/456 |
| 4,051,920 | A | * | 10/1977 | Reinsma ................. B60R 17/00 141/7 |

(Continued)

FOREIGN PATENT DOCUMENTS

RU    2302584    10/2007

*Primary Examiner* — Minh Le
(74) *Attorney, Agent, or Firm* — Dunlap Codding, P.C.

(57) ABSTRACT

A leak detection system for detecting leaks in a fluid plumbing system having a fluid supply line maintained within a predetermined elevated pressure range, at least one normally open supply valve having an actuator integral therewith for closing the valve in response to a supply of electrical power, a normally open circuit having at least one relay to connect the actuator with a source of electrical power, at least one programmable timer positioned opposite the at least one relay, wherein the timer contains a program formulated to initiate an electrical signal to close the relay and complete the circuit to supply electrical power to the actuator to close the supply valve, and at least one normally open pressure switch connected to the circuit and arranged to close when system pressure drops below a set point to complete the circuit and supply electrical power to close the supply valve.

5 Claims, 2 Drawing Sheets

(56) References Cited

U.S. PATENT DOCUMENTS

| | | | | |
|---|---|---|---|---|
| 4,180,088 A * | 12/1979 | Mallett | | G01M 3/2807 137/459 |
| 4,249,565 A * | 2/1981 | Brust | | F16K 31/00 137/487.5 |
| 4,589,435 A * | 5/1986 | Aldrich | | F16K 21/16 137/102 |
| 4,705,060 A * | 11/1987 | Goulbourne | | F17D 5/02 137/102 |
| 4,735,231 A * | 4/1988 | Jacquet | | F17D 5/02 137/459 |
| 4,736,763 A * | 4/1988 | Britton | | D06F 39/081 137/10 |
| 4,911,200 A | 3/1990 | Ben-Arie | | |
| 5,004,014 A | 4/1991 | Bender | | |
| 5,038,820 A * | 8/1991 | Ames | | F16K 31/02 137/460 |
| 5,086,806 A * | 2/1992 | Engler | | G01F 15/003 137/486 |
| 5,283,552 A | 2/1994 | Sol | | |
| 5,568,825 A * | 10/1996 | Faulk | | E03B 7/071 137/486 |
| 5,827,950 A * | 10/1998 | Woodbury | | F23N 5/242 431/16 |
| 5,920,265 A * | 7/1999 | Johnson, Jr. | | G01M 3/2815 200/61.05 |
| 5,971,011 A * | 10/1999 | Price | | E03B 7/071 137/456 |
| 6,119,720 A | 9/2000 | Isaacson, Jr. et al. | | |
| 6,317,051 B1 * | 11/2001 | Cohen | | G01M 3/2807 340/603 |
| 6,374,846 B1 * | 4/2002 | DeSmet | | E03B 7/071 137/15.01 |
| 6,543,479 B2 | 4/2003 | Coffey et al. | | |
| 6,708,722 B1 * | 3/2004 | Goodenough | | E03B 7/071 137/460 |
| 6,753,554 B1 | 6/2004 | Gomes et al. | | |
| 7,204,270 B2 * | 4/2007 | Hendrix | | E03D 1/00 137/486 |
| 7,299,814 B2 * | 11/2007 | Fenton | | F17D 5/02 137/1 |
| 7,360,413 B2 | 4/2008 | Jeffries et al. | | |
| 7,574,896 B1 * | 8/2009 | Cooper | | G01M 3/2815 73/40.5 R |
| 7,900,647 B2 | 3/2011 | Tornay | | |
| 7,900,650 B1 * | 3/2011 | Wilson | | F17D 5/00 137/551 |
| 8,561,636 B2 * | 10/2013 | Eithun | | F17D 5/02 137/487.5 |
| 8,720,481 B2 * | 5/2014 | Guy | | E03B 7/071 137/486 |
| 9,297,150 B2 * | 3/2016 | Klicpera | | E03B 7/071 |
| 9,297,467 B1 * | 3/2016 | Goseco | | G01M 3/28 |
| 9,324,228 B2 * | 4/2016 | Trout | | G08B 21/20 |
| 2002/0148515 A1 | 10/2002 | Coffey et al. | | |
| 2004/0050790 A1 | 3/2004 | Baarman et al. | | |
| 2004/0134545 A1 | 7/2004 | Ford | | |
| 2004/0206405 A1 | 10/2004 | Smith et al. | | |
| 2008/0066812 A1 | 3/2008 | Tornay | | |
| 2010/0000615 A1 * | 1/2010 | Finlayson | | G01M 3/2807 137/487.5 |
| 2010/0212748 A1 * | 8/2010 | Davidoff | | F17D 5/02 137/1 |
| 2011/0073189 A1 * | 3/2011 | Elbert | | E03B 7/071 137/1 |
| 2014/0000729 A1 * | 1/2014 | Meyer | | G01M 3/18 137/487.5 |
| 2015/0114490 A1 * | 4/2015 | Carpenter | | E03B 7/072 137/460 |

\* cited by examiner

WATER SYSTEM LEAK DETECTION

BACKGROUND OF THE INVENTION

The described and claimed inventive concept(s) relate to water system management, and, more particularly, to a water piping system that is capable of identifying excess or unexpected water use, and then automatically isolating the system whereby property damage, e.g., from escaping water, and water loss are minimized.

Undetected water usage, e.g., water leaking from pipe joints and/or a broken pipe, or an improperly closed toilet valve, has long been an issue for building owners, especially during long periods of time when buildings remain unoccupied, or when homeowners may be on vacation. If a water leak or unexpected use goes undetected for an extended period, extensive property damage can result and substantial water loss can occur. Typically, excess water use and property damage is only discovered after the fact when a homeowner returns from vacation or an unusually high water/sewer bill is received.

One technique for detecting fluid loss in pressurized installations, including water piping, is to pressurize the installation and then isolate the installation while continuously monitoring the system pressure. A drop in pressure indicates a loss of fluid, and the reason for such loss can generally be found through inspection.

Existing technologies pertaining to water loss control and damage reduction from leaking water of the type described in U.S. Pat. No. 4,735,231, U.S. Pat. No. 6,543,479 B2, and U.S. Pat. No. 7,900,647, for example, can be complicated and generally require relatively expensive equipment. Furthermore, the systems described in the foregoing patents employ normally closed isolation valves that not only stay closed during power outages, but also require bypassing steps to allow the use of water during the outages. For example, the systems described in U.S. Pat. Nos. 4,735,231 and 6,543,479 initiate opening of the normally closed valves by pressure drops in the water system, and only permit the valves to remain open for a predetermined period of time. When the predetermined time period expires, these systems return the isolation valves to a locked out, i.e., closed, condition. U.S. Pat. No. 7,900,647 B2 employs a switch at each expected use point in the system to establish whether the drop in system pressure is due to normal use. Each of these technologies requires a fairly sophisticated programmable controller or computer for continuous operation. Thus, there is a need for a simple and inexpensive means for detecting and controlling leaks in water and other fluid piping systems.

SUMMARY OF THE INVENTION

The presently described and claimed inventive concept(s) relate to a leak detection system for monitoring and detecting leaks in a fluid plumbing system, such as a residential or commercial water plumbing system. Some water plumbing systems typically have a main or primary fluid supply line that delivers water to the residence or business at an elevated system pressure set by the water company or water provider. Other piping systems have water delivered by a well pump that supplies water at an elevated pressure which can vary from a minimum to a maximum value controlled by a pressure control switch. The described and claimed inventive concept(s) provides protection for piping systems that are maintained at a constant elevated water pressure and also for those water piping systems that are supplied by pumps in which the pressure can vary within a predetermined range.

The leak detection system comprises a fluid supply line having at least one normally open supply valve located in the supply line upstream from the fluid plumbing system in close proximity to where the water supply enters the residence or business. The supply valve is capable of remote activation, meaning that the valve includes an integral electrically controlled actuator, such as, for example, a solenoid or other similar means, whereby the actuator can close the valve in response to a supply of electrical power. The actuator is connected to a source of electrical power by a normally open circuit. A primary pressure switch is electrically connected to the normally open circuit. It is typically located within the residential or business plumbing system in close proximity to the supply valve to monitor system pressure. When low pressure is indicated below a set pressure point, the pressure switch closes to complete the electrical circuit and deliver electrical power to the supply valve actuator which in response closes the supply valve. When electrical power to the supply valve is interrupted, the supply valve actuator opens the valve, pressure in the system rises, the pressure switch opens, and the plumbing system returns to its normal operating condition.

According to one embodiment, electrical power is supplied to the supply valve activator through a relay positioned in the normally open circuit. A programmable timer is positioned opposite the relay and includes a program formulated to initiate an electrical signal to close the relay at predetermined intervals and for predetermined periods of time to thereby complete the circuit and supply electrical power to the actuator to close the supply valve. The programmable timer must be capable of maintaining real time and of being programmed to initiate and terminate relay activation at specified times, e.g., at predetermined intervals over a period of days or weeks, whereby the relay can be activated to supply electrical power to the water supply valve actuator and close the valve. A programmable timer of the type found in a lawn sprinkler system with an output voltage of 24 VAC is suitable for this application.

The programmable timer is programmed to initiate a pressure test on the plumbing system by communicating an electrical signal to activate the relay and close the circuit to supply electrical power to the supply valve activator independently from the pressure switch which causes the supply valve to close and isolate the plumbing system. As noted above, the pressure test program can be set for initiation at predetermined intervals and for predetermined periods of time. If the pressure in the water system drops to or below a preset value during a test period, the pressure switch will close the circuit to maintain an electrical power supply to the supply valve actuator so that the supply valve will remain closed until electrical power to the valve activator or the pressure switch is interrupted. Thus, water loss and/or leakage within the residence or business is eliminated or substantially reduced. The pressure switch for the described application can be the type used for controlling the operation of water well pumps. Such switches have electrical contacts that close when the pressure drops to a predetermined, but adjustable, set point, and the electrical contacts remain closed until the pressure returns to a preset higher level. Thus, according to this embodiment, the supply valve remains closed until the valve actuator is manually reset by opening the electrical circuit.

The circuit may also include a manual electrical off/on switch to allow a manual test of the system at any desired time. Closing the switch completes the circuit which thereby supplies electrical power to the supply valve actuator causing the supply valve to close, putting the system in a manual test mode. The same functions occur as during the programmed mode so long as the manual on-off switch is in the closed, i.e., on, position.

The plumbing system may be of the type that includes at least one expansion tank having at least one additional actuator valve located in the fluid supply line to the expansion tank. The at least one expansion tank, typically located downstream from the system's main supply actuator valve, must have its actuator wired in parallel with the actuator of the main supply valve. All actuator valves are normally in the open position. Thus, when electrical power is supplied to close the main supply valve, the actuator valve in the fluid supply line to the expansion tank will simultaneously close with the result that the expansion tank is isolated from the plumbing system. Absent a reliable means for isolating the main plumbing system from the expansion tank(s), compressed air in the expansion tank(s) could reduce the sensitivity of the leak detection system.

DETAILED DESCRIPTION OF THE INVENTION

Figure 1:
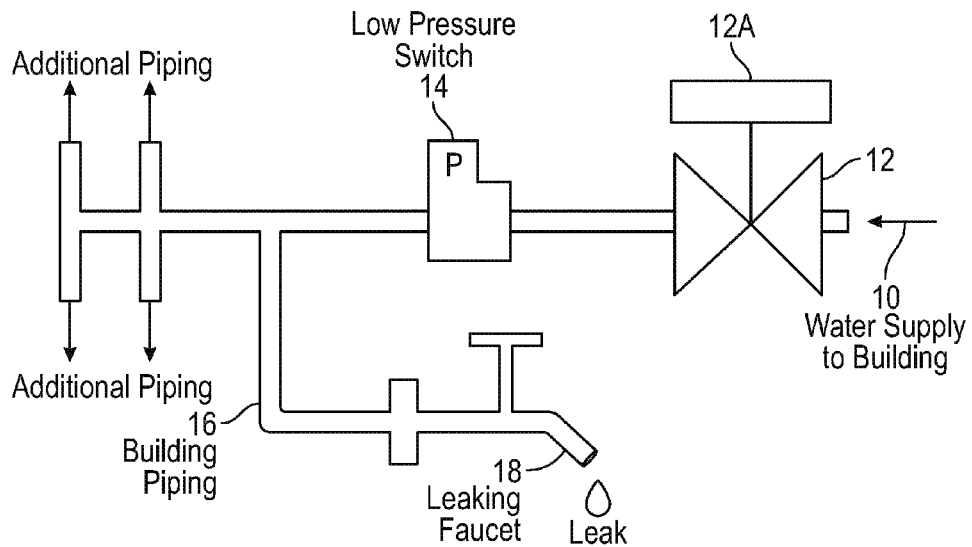
FIG. 1 is a schematic diagram of a simple water plumbing system showing the leak detection components according to the described and claimed inventive concept(s).

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The presently described and claimed inventive concept(s) relate to a leak detection system for monitoring and detecting leaks in a fluid plumbing system, such as a residential or commercial water plumbing system. The components of the system are electrically interconnected and arranged with a programmable timer to automatically initiate tests to check the system for unexpected water usage and/or water loss at predetermined intervals and for predetermined time periods. When a leak is identified, the system operates to close off the water supply and thereby isolate the plumbing system so that ongoing water leakage is minimized and property damage is reduced or eliminated.

The leak detection system includes a supply valve having an actuator integral therewith for remotely opening and closing the valve in response to electrical power being supplied through a normally open circuit. The circuit is closed independently through either action of a primary pressure switch, through a relay activated by a programmable timer, or through a manual off/on switch. The supply valve is normally in the open position. When the leak detection system is placed in test mode by the timer activating the relay to close the electrical circuit, or by a manual on/off switch that provides for by-passing the pressure switch, electrical power is delivered to activate the actuator to close the supply valve with the result that the plumbing system is isolated from the supply line.

Under normal conditions with no leaks the plumbing system pressure will remain relatively constant at a predetermined elevated value. When the pressure reaches a preset level below the normal operating level, such as a leak occurring during a system test period, the pressure switch will close to complete the circuit, and electrical power will be supplied to the supply valve actuator with the result that the supply valve will remain closed even though the time period for a system pressure test initiated independently by the timer, or initiated manually, has ended.

The system includes an alarm light positioned for easy viewing which illuminates automatically when the supply valve actuator is signaled to close the supply valve. The alarm light remains illuminated until the supply valve is opened. A homeowner or business owner would typically discover an illuminated alarm light and/or complete loss of water supply pressure, identify and repair the source of water loss or leakage, and then manually turn off the power to the supply valve actuator whereby the valve will open and allow the system to re-pressurize. If the cause of the water loss is minor and repair can be delayed, the system can be returned to normal operation by manually interrupting the power supply to the leak detection system using the system's manual on/off switch.

According to one embodiment, the timer is programmed to initiate a pressure test by activating the relay which thereby completes the electrical circuit to the valve actuator to remotely close the supply valve and isolate the plumbing system. A pressure test can be initiated at predetermined intervals and for predetermined periods of time. At the end of a test period the programmable timer deactivates the relay to thereby terminate, i.e., open, the electrical circuit to the supply valve actuator. The supply valve will open and the plumbing system will return to normal operation unless the pressure switch has closed the circuit independently in response to a low pressure indication. If low pressure is detected, the pressure switch closes to complete a separate electrical circuit that delivers power to the supply valve actuator independently from the relay to maintain the supply valve in the closed position, which, in turn, avoids water leakage within the residence or business. If the system has been placed in the manual mode, switching the manual switch to "off", i.e., opening the circuit, will cause the same actions that occur when the programmable timer deactivates the relay to interrupt electrical power being supplied to the isolation valve.

Figure 2:
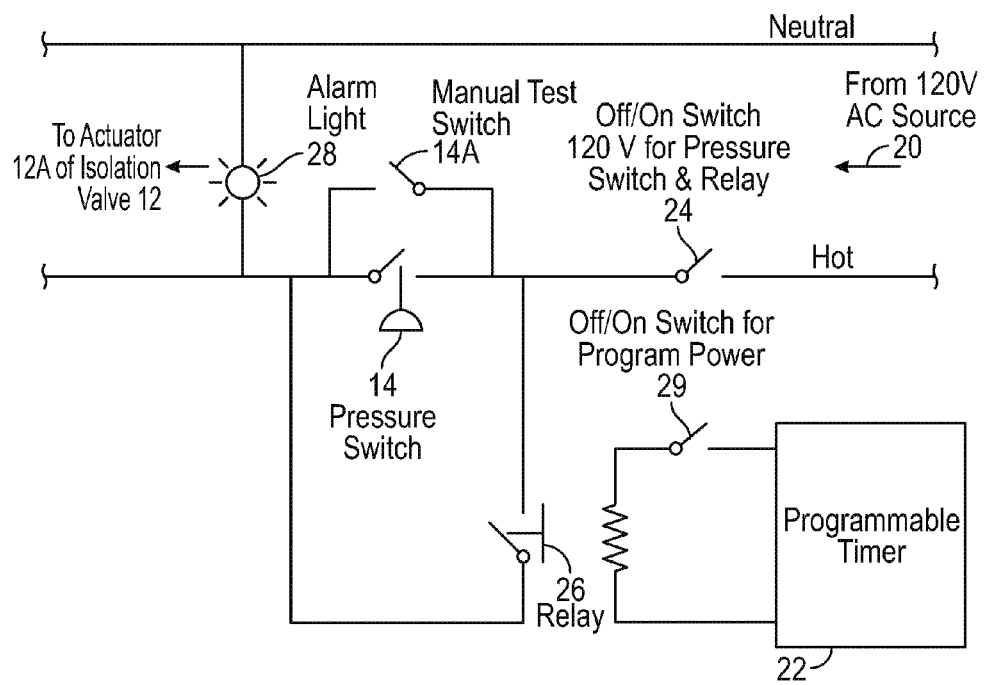
FIG. 2 is a simplified 120 VAC wiring diagram for the plumbing system shown in FIG. 1.
Figure 3:
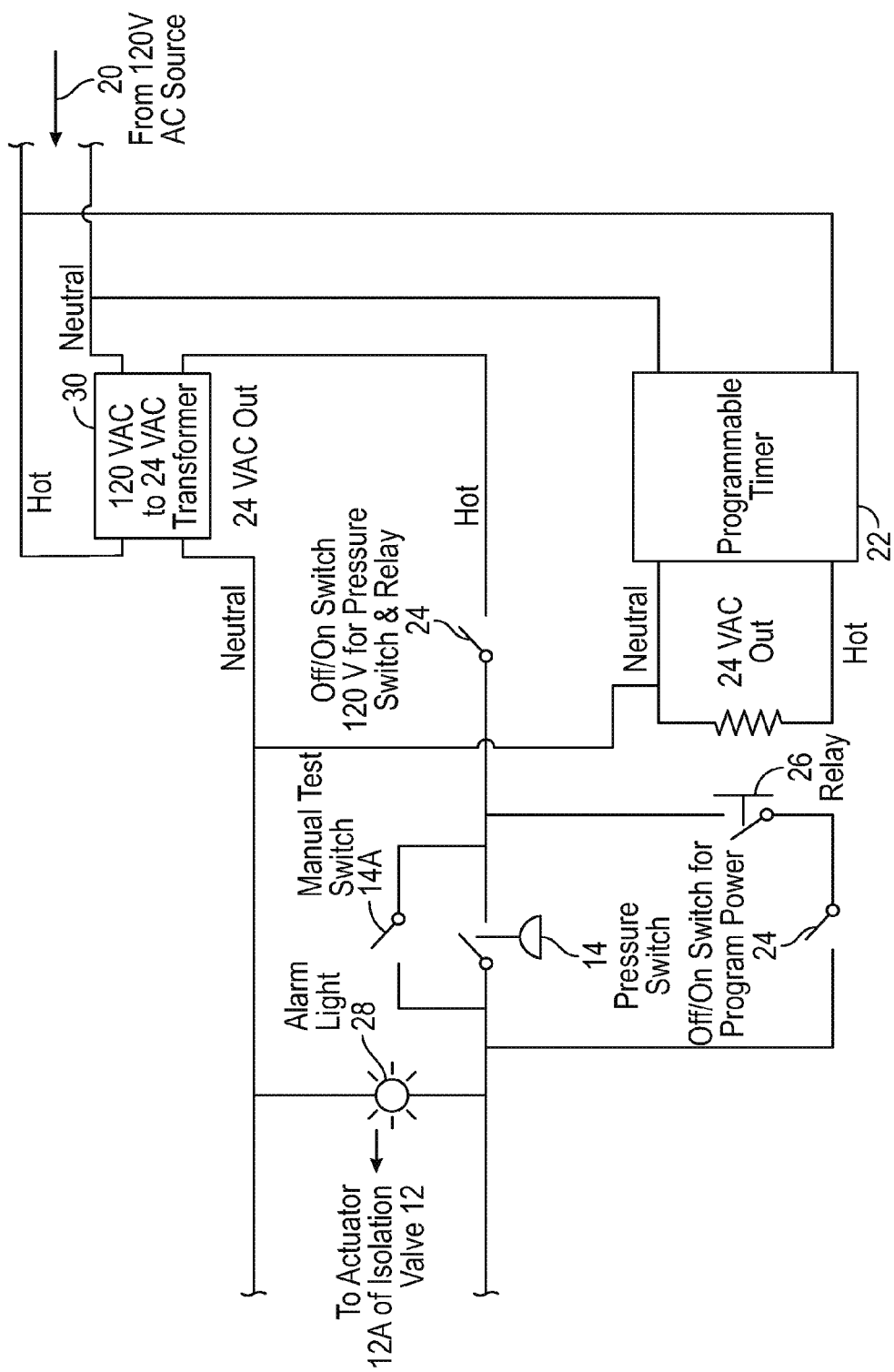
FIG. 3 is a simplified 24 VAC wiring diagram for the plumbing system shown in FIG. 1.

Referring now to FIG. 1, a schematic diagram of a water plumbing system 16 is shown with a leaking spigot or faucet 18. Water enters the plumbing system at location 10 through normally open supply valve 12. Supply valve 12 includes a remotely controlled integral electrical actuator 12A. One or more primary or secondary low pressure switches 14 are positioned downstream from supply valve 12. FIG. 2 is a simplified schematic wiring diagram to further illustrate the components which comprise the leak detection system. Electrical power is supplied via a 120 VAC power source 20. Programmable timer 22 is shown electrically in relation to relay 26. The system is energized by closing power switch 24, whereby a normally open electrical circuit, including primary or secondary low pressure switch 14, relay 26 and valve actuator 12A, is established. At any time that timer 22 activates relay 26 in response to initiation of a pressure test of the plumbing system by the timer according to its installed program(s), the electrical circuit is completed, and power is delivered to valve actuator 12A. Valve actuator 12A is energized to thereby close supply valve 12 whereby the plumbing system within the residence or business is isolated from the main water supply. Simultaneously when valve 12 is closed, alarm light 28 is illuminated. The system can also be manually placed in a test mode by closing switch 14A. FIG. 3 is a simplified schematic wiring diagram that adds a 120 VAC to 24 VAC transformer 30 in the circuit which allows the use of low voltage wiring. Other components of the system must be compatible with the voltage used.

According to the described and claimed inventive concept(s), timer 22 is programmed to periodically initiate plumbing system pressure tests, which action is particularly important when a residence or business will remain unoccupied for an extended period of time. The timer can preferably be set to initiate tests during periods in which water use normally would not be occurring, such as during the middle of the night. Since water is a non-compressible liquid, a relative small leak in an isolated rigid piping system would cause a relatively significant system pressure drop. Experiments have shown that a fraction of an ounce water leak will cause the pressure switch to activate and close the supply valve. The more frequently a plumbing system is placed into a test mode and the longer the test period, the greater the opportunity for detecting a leak. Practically, testing the plumbing system once per day for a period of one hour will provide satisfactory protection. The leak detection system may include one primary remotely actuated supply valve, or the plumbing system may be divided into discreet segments, such as for multiple apartments on a single water supply, and each segment may have its own remotely actuated supply valve, pressure switch(s), relay, etc., electrically connected to a programmed timer, capable of handling multiple segments or to multiple programmable timers.

In operation, if the plumbing system incurs a leak during a test, such as via faucet 18, or other faucets, or via a leaking toilet, or a burst pipe joint, the pressure within the plumbing system, or system segment, will drop. When the pressure drop reaches a preset value, low pressure switch 14 will close, and even though timer 22 will deactivate relay 26 at the end of the pressure test, electrical power will continue to be delivered to valve actuator 12A. Valve actuator 12A maintains valve 12 in a closed position, and alarm light 28 remains illuminated. The plumbing system will remain isolated until power to supply valve actuator 12A is interrupted, i.e., the circuit is opened, and valve 12 is permitted to return to its normally open position. Water that could have escaped from the leak in the plumbing system will be reduced substantially and potential property damage will also be reduced. The closer that the pressure switch activation pressure is set below the normal water supply pressure, the less leakage will be required for detecting a leak. The longer a test period, the greater the opportunity will be for detecting a leak.

Critical components which were tested and worked with satisfactory results in a prototype based upon the 120 VAC schematic diagram shown in FIG. 2 include: Orbit Easy Dial Sprinkler Timer Model 28954 with a 120 VAC to 24 VAC transformer having a 13 watt output; Square D Pumptrol pressure switch (Cat. No. FSG2J20CP) with a pressure range of 15 psi-35 psi and rated to 1½ hp @ 120 VAC; Grainger #6CWZ2 SPDT relay with a 24 VAC coil using I watt power and output contacts rated for 1 hp @ 120 VAC; and a one inch normally open solenoid valve model ZW-25K and SKU NOB10-110 VAC with Viton™ seal material and with a 24 VAC coil that consumes 1 watt power from Electric Solenoid Valves. Components for the leak detection system should be compatible with local plumbing and electrical codes and with other system components.

According to another embodiment, the sensitivity of the described and claimed system for detecting massive water loss, such as water loss resulting from a broken pipe when the system testing mode is not operating, can be further optimized by adding one or more low pressure switches (secondary pressure switches) at locations in the plumbing system where the lowest pressures occur during normal operation, such locations as, for example, at the highest point of the plumbing system and/or at a remote point(s) in the plumbing system, e.g., at locations furthermost from the supply valve. The one or more secondary pressure switches would then be set to close at predetermined pressure activation values below the expected pressure the plumbing system would see during maximum water use under normal circumstances. The term "normal circumstances" is used in this context to mean periods of water use with multiple faucets simultaneously being opened (e.g., bath tub, sinks, shower) and water-consuming appliances (e.g., dishwasher, clothes washer) also being in use. All of the system pressure switches would be wired to the actuator supply valve in parallel. However, the pressure activation point for each secondary pressure switch would be set at a value lower than the pressure activation point set for the primary pressure switch.

As those skilled in the art will appreciate, numerous modifications and variations of the described and claimed inventive concept(s) are possible in light of these teachings, such as pneumatic control components in lieu of electrical control components, and all such are contemplated hereby. The present invention contemplates and claims those inventions that may result from the combination of features described herein and those of the cited prior art references which complement the features of the present invention.

What is claimed is:

1. A leak detection system programmed to automatically initiate system tests at predetermined intervals and for predetermined periods of time to thereby detect leaks in a fluid plumbing system by monitoring system pressure drops below a set point independently of fluid flow, said fluid plumbing system having a fluid supply line for delivering a fluid supply to the plumbing system at an elevated pressure within a predetermined pressure range which comprises:

(a) at least one normally open supply valve located in said fluid supply line upstream from said fluid plumbing system having an actuator integral therewith for closing said supply valve in response to a supply of electrical power to thereby isolate the plumbing system from the fluid supply;

(b) a normally open circuit having at least one relay to connect said actuator with a source of electrical power;

(c) at least one programmable timer positioned opposite said at least one relay, said timer having a program formulated to initiate an electrical signal independently of fluid flow to close said relay at predetermined intervals and for predetermined periods of time to complete said circuit and supply electrical power to said actuator to close said supply valve; and (d) at least one normally open primary pressure switch connected to said circuit and located in said fluid plumbing system, said normally open primary pressure switch arranged to monitor fluid plumbing system pressure and to close when said pressure drops below the set point to thereby complete said circuit and supply electrical power to said actuator to close said supply valve with the result that the plumbing system is isolated from the fluid supply line.

2. The leak detection system of claim 1 further comprising a manual switch positioned in said normally open circuit for manually completing said circuit to supply electrical power to said actuator to close said supply valve independently from said programmable timer.

3. The leak detection system of claim 2 further comprising a light positioned in said normally open circuit and arranged to illuminate when said circuit is closed.

4. The leak detection system of claim 1 further comprising an expansion tank located in said fluid supply line downstream from said normally open supply valve, a second normally open isolation valve positioned for isolating said expansion tank having an actuator integral therewith connected to said normally open circuit for activating to close said isolation actuator valve in response to a supply of electrical power when said normally open circuit is closed.

5. The leak detection system of claim 1 further comprising at least one normally open secondary pressure switch connected to said circuit and located in said fluid plumbing system at a position remote from said supply valve, said normally open secondary pressure switch having a set point lower than the set point of said primary pressure switch and arranged to monitor fluid plumbing system pressure and to close when said pressure drops below said lower set point to complete said circuit and supply electrical power to said actuator to close said supply valve.

* * * * *